United States Patent Office 3,018,293
Patented Jan. 23, 1962

3,018,293
NOVEL 18-NOR-PREGNANIC DERIVATIVE AND PROCESS FOR ITS PREPARATION
Gaston Amiard, Noisy-le-Sec, and Rene Heymes, Romainville, France, assignors to Les Laboratoires Francais de Chimiotherapie, Paris, France, a corporation of France
No Drawing. Filed Dec. 16, 1960, Ser. No. 76,155
Claims priority, application France Dec. 24, 1959
16 Claims. (Cl. 260—339)

The present invention has as its object a novel 18-nor-pregnanic derivative, $\Delta^{16}$ - 18 - nor - pregnene - 3,11,20-trione, of Formula I:

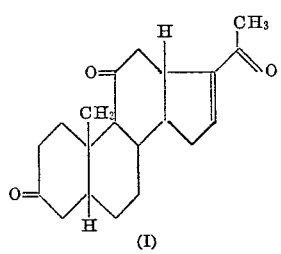

as well as the process for its preparation.

Many very useful compounds of the pregnane series are known which do not have the angular methyl group in the 10 position (19-nor-pregnanes) and which have an activity superior to that of their 10-methylated homologs of the regular series.

Recently Anliker et al., Helv. Chem. Acta, 1959, page 1071, have prepared certain compounds lacking the angular methyl group in the 13 position, namely, $\Delta^4$-18-nor-pregnene-3,20-dione or 18-nor-progesterone.

The novel compound of the invention, $\Delta^{16}$-18-nor-pregnene-3,11,20-trione, lacks the angular methyl group in the 13 position and, due to the 11-oxygenated function, is a useful intermediate in the synthesis of steroids lacking the angular methyl group in the 13 position of the cortisone series. It is used in the preparation of 18-nor-cortisone, a compound having cortisonic activity, by a process of hydroxylation of the $\Delta^{16}$ bond to introduce a 17α-hydroxy group, dehydrogenation to introduce a $\Delta^4$ bond and hydroxylation of the 21 carbon atom to introduce a 21-hydroxy group. It may also be used in the synthesis of other 18-nor-steroids.

An object of the present invention is the production of $\Delta^{16}$-18-nor-pregnene-3,11,20-trione.

Another object of the present invention is to develop a process which is economical and easily used for the preparation of $\Delta^{16}$-18-nor-pregnene-3,11,20-trione.

A further object of the invention is the production of intermediates useful in the preparation of $\Delta^{16}$-18-nor-pregnene-3,11,20-trione, as follows:

(a) 3α - acetoxy - 17 - methyl - 18 - nor - D - homo-etiocholane-17-ol-11-one;
(b) 17 - methyl - 18 - nor - D - homo - etiocholane-3α,17-diol-11-one, III;
(c) 17 - methyl - 18 - nor - D - homo - etiocholane-17-ol-3,11-dione, IV;
(d) 17 - chloro - 17 - methyl - 18 - nor - D - homo-etiocholane-3,11-dione, V;
(e) 17 - methyl - 18 - nor - D - homo - $\Delta^{16}$ - etiocholene-3,11-dione and its 3-ethylene-acetal, VI;
(f) 17 - methyl - 18 - nor - D - homo - $\Delta^{17}$ - etiocholene-3,11-dione and its 3-ethylene-acetal, VIa;
(g) the ozonide of 17-methyl-18-nor-D-homo-$\Delta^{16}$-etiocholene-3,11-dione, VII;
(h) 2α - acetonyl - 4,7 - dione - 1β - formylmethyl - 4bβ-methyl-8aβ-perhydrophenanthrene, VIII;
(i) 18-nor-pregnane-16ξ-ol-3,11,20-trione.

These and other objects of the invention will become more apparent as the description thereof proceeds.

In accordance with the process of the invention, the stages of which are shown in the flow sheet of Table I, $\Delta^{16}$-18-nor-pregnene-3,11,20-trione is obtained starting from 3α - acetoxy - 18 - nor - D - homo - etiocholane-11,17-dione, II. The preparation of the starting material is described in U.S. patent application Serial No. 846,246, filed October 14, 1959.

TABLE 1

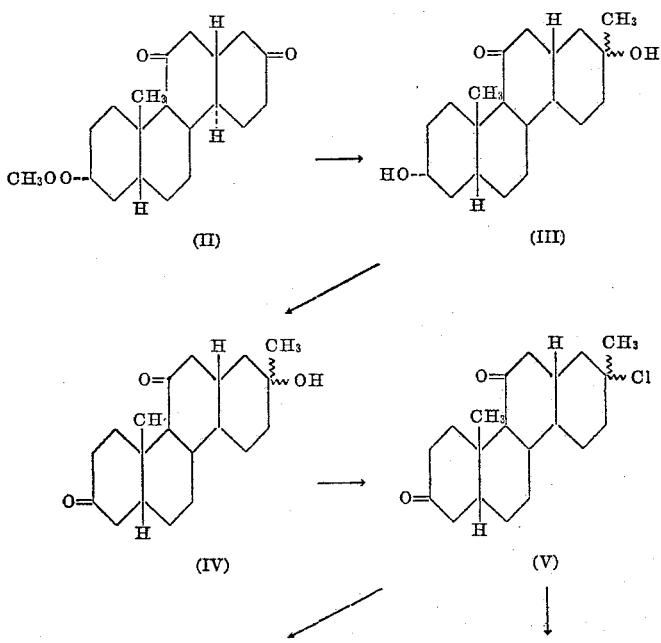

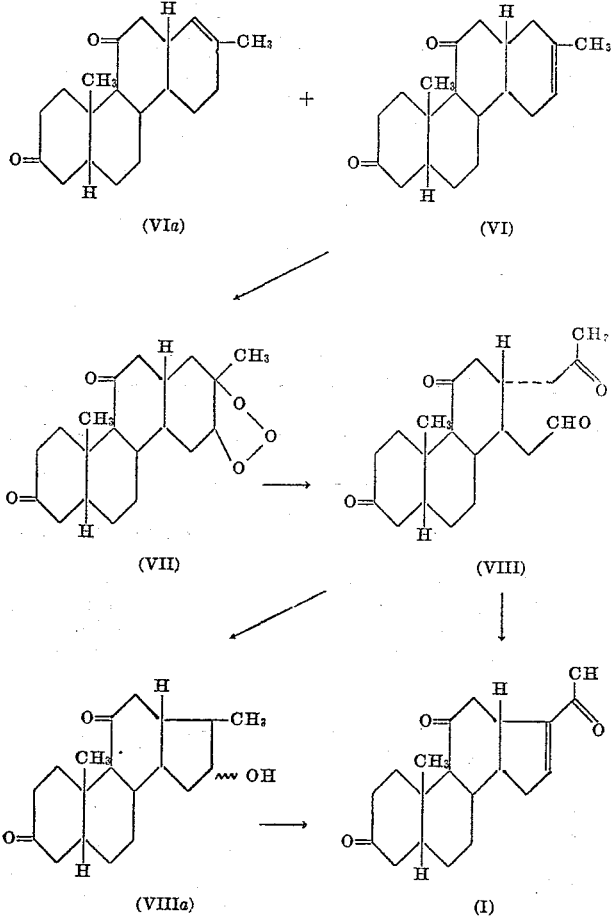

3α-acetoxy-18-nor-D-homo-etiocholane - 11,17 - dione, II, is reacted with a methylmagnesium halide to give 3α-acetoxy-17-methyl-18-nor-D-homo-etiocholane-17-ol - 11-one. The acetoxy group in the 3-position of this compound is saponified into a hydroxyl group. The 17-methyl-18-nor-D-homo-etiocholane-3α,17-diol - 11 - one, III, is oxidized to convert the 3α-ol into a ketone which is obtained in its two stereoisomer forms. 17-methyl-18-nor-D-homo-etiocholane-17-ol-3,11-dione, IV, thus obtained in its two stereoisomer forms is transformed, by the action of hydrochloric acid, into 17-chloro-17-methyl-18-nor-D-homo-etiocholane-3,11-dione, V, which is dehydrochlorinated to obtain a mixture of 17-methyl-18-nor-D-homo-Δ16-etiocholene-3,11-dione, VI, and its Δ17-isomer, VIa. The two compounds are separated by an acetalization of their ketones in the 3-position and crystallization of the 3-acetal of the Δ16-isomer. After hydrolysis of the 3-acetal, the Δ16-isomer, VI, is subjected to an attack by ozone. The ozonide of 17-methyl-18-nor-D-homo-Δ16-etiocholene-3,11-dione, VII, formed thereby, is next reduced and the desired 2α-acetonyl-4,7-dione-1β-formylmethyl-4bβ-methyl - 8aβ - perhydrophenanthrene, VIII, is obtained. This latter compound is selectively cyclized in the presence of an alkaline base to form the Δ16-18-nor-pregnene-3,11,20-trione, I, of the invention.

According to another characteristic of the invention, the 17-methyl-18-nor-D-homo-Δ17-etiocholene-3,11-dione compound, VIa, is retransformed into the chlorinated intermediate (compound V), which avoids discarding this by-product and allows the production of the latter stages and final product in very high yields.

Within the scope of the above general definition of the invention, the process is advantageously executed by the following steps:

(a) The reaction between 3α-acetoxy-18-nor-D-homo-etiocholane-11,17-dione, II, and methylmagnesium halide is preferably conducted under anhydrous conditions in inert organic solvents, such as benzene and tetrahydrofuran, at temperatures between about —5° C. and room temperature using methylmagnesium bromide.

(b) The saponification of 3α-acetoxy-17-methyl-18-nor-D-homo-etiocholane-17-ol-11-one is conducted in the presence of an alkali metal hydroxide and an aqueous lower alkanol, preferably aqueous methanol and sodium hydroxide at elevated temperatures.

(c) The oxidation of the 3α hydroxyl group of 17-methyl-18-nor-D-homo-etiocholane-3α,17-diol-11 - one is conducted preferably by an N-bromo-imide or N-bromoamide, such as N-bromosuccinimide, in the presence of an aqueous tert.-lower-alkanol, such as tert.-butanol, at elevated temperature.

(d) The 17-methyl-18-nor-D-homo-etiocholane-17-ol-3-11-dione is reacted with concentrated hydrochloric acid in an inert organic solvent such as ether at about room temperature.

(e) The 17-chloro-17-methyl-18-nor-D-homo-etiocholane-3,11-dione is dehydrochlorinated preferably by heating with a mixed lithium bromide-lithium carbonate in an inert organic solvent such as dimethylformamide at temperatures between about 100° C. and about 130° C.

(f) The 17 - methyl-18-nor-D-homo-Δ16-etiocholene-3,11-dione is separated from its Δ17-isomer by forming the 3-ethylene acetal of the mixture of isomers by reacting them in an inert organic solvent with ethylene glycol in the presence of a small amount of a strong organic acid catalyst, such as p-toluene sulfonic acid. The $\Delta^{16}$-acetal is separated from its $\Delta^{17}$-isomer by the difference in solubility in organic solvents such as methanol or hexane.

(g) The 3-ethylene acetal of 17-methyl-18-nor-D-homo-$\Delta^{16}$-etiocholene-3,11-dione is hydrolyzed by the action of aqueous organic acids, such as aqueous acetic acid, at elevated temperatures.

(h) The mother liquors from the separation step (f) above are evaporated to dryness and treated according to (d) above to rehydrochlorinate the $\Delta^{17}$-isomer to form 17-chloro-17-methyl-18-nor-D-homo-etiocholane-3,11-dione, which is then returned to the process.

(i) The 17-methyl-18-nor-D-homo-$\Delta^{16}$-etiocholene-3,11-dione is oxidized by dissolving in an anhydrous lower alkanol and reacting with ozonized oxygen at temperatures below 0° C. and preferably at about −75° C.

(j) The ozonide of 17-methyl-18-nor-D-homo-$\Delta^{16}$-etiocholene-3,11-dione is reduced by treating the solution of (i) above with hydrogen and thereafter with zinc in the presence of an organic acid such as acetic acid at temperatures between about −75° C. and 0° C. The zinc is removed and a solution of 2α-acetonyl-4,7-dione-1β-formylmethyl-4bβ-methyl-8aβ-perhydro phenanthrene in an anhydrous lower alkanol, such as ethanol, is obtained.

(k) The alcoholic solution of the aldehyde compound is cyclized by reacting with an aqueous alkali metal hydroxide solution at temperatures between about 60° and 100°, preferably between 85 and 90°, and the desired $\Delta^{16}$-18-nor-pregnene-3,11,20-trione is obtained.

The following examples which are given to illustrate the process of the invention are non-limitive in character and will make the invention better understood to one skilled in the art. The temperatures are given in degrees centigrade.

EXAMPLE

Preparation of $\Delta^{16}$-18-nor-pregnene-3,11,20-trione, 1

(1) 17-CHLORO-17-METHYL-18-NOR-D-HOMO-ETIOCHOLANE-3,11-DIONE, V (a) *Grignard reaction.*—34.65 gm. of 3-acetoxy-18-nor-D-homo-etiocholane-11,17-dione, II, obtained according to the process of U.S. patent application Serial No. 846,246, filed October 14, 1959, were dissolved in 350 cc. of anhydrous benzene. The steroid solution was slowly added, under an atmosphere of nitrogen and while agitating, to a mixture of 400 cc. of benzene and 210 cc. of a solution of 0.95 N-methyl magnesium bromide in tetrahydrofuran, cooled to −5° C. The reaction mixture was next agitated at room temperature for 30 minutes, after which it was recooled to −5° C. and hydrolyzed by addition dropwise of 250 cc. of a 10% solution of ammonium chloride. The hydrolyzed reaction mixture was acidified to a pH of 6 to 7 with hydrochloric acid and concentrated in vacuo. The residue, consisting essentially of 3α-acetoxy-17-methyl-18-nor-D-homo-etiocholane-17-ol-11-one, was crystallized from methanol and furnished a product melting at about 170° C.

(b) *Saponification.*—The crystals obtained under (a) above were introduced into a mixture of 100 cc. of methanol, 20 cc. of water and 15 cc. of caustic soda and heated under agitation to 50 C. for one hour. The mixture was precipitated then by addition of water and vacuum filtered. The product thus obtained was washed with aqueous methanol, with ether, with dilute hydrochloric acid and with water. After drying 20 gm. (that is, 62.5% of theory) of an isomer in the 17 position of 17-methyl-18-nor-D-homo-etiocholane-3α,17-diol-11-one, III, were obtained having a melting point of 220° C. for analysis, the product was recrystallized from aqueous alcohol and a sample was obtained which melted at 222° C. and had a specific rotation $[\alpha]_D^{20}=+21°$ (c.=1% in alcohol). It was soluble in alcohol, and insoluble in ether, benzene and chloroform. After distillation of the mother liquor from vacuum filtration, the second isomer in the 17 position of 17-methyl-18-nor-D-homo-etiocholane-3α,17-diol-11-one, III, was obtained. It was vacuum filtered, washed as previously described and 11 gm. (that is, 34.5% of theory) of the product was obtained, which melted at 180° C.

(c) *Oxidation.*—31 gm. of compound III (mixture of two isomers in the 17-position) were introduced in 310 cc. of tert-butanol and 62 cc. of water, heated to 60° C. and 36.2 gm. of N-bromo-succinimide were added thereto, under agitation. The heating was stopped after 3 minutes and the agitation was continued for several minutes more. The mixture was poured over a mixture of water and ice containing 20 cc. of sodium bisulfite and then the decolorized solution was neutralized by sodium carbonate. The tert-butanol was evaporated in vacuo and the solution was extracted several times with ethyl acetate. 6.2 gm. of zinc and 3.2 cc. of acetic acid were added to the ethyl acetate extracts and the solution was heated to reflux for 10 minutes. It was then treated with animal charcoal and filtered with suction. The solution was washed with water and with a solution of sodium bicarbonate. After drying, 32.5 gm. of 17-methyl-18-nor-D-homo-etiocholane-17-ol-3,11-dione, IV (mixture of the two 17-isomers), were recovered which was used without any purification for the following stage of the synthesis.

While working, in an analogous manner, separately with the two isomers of compound III, the two 17-isomers of compound IV were obtained, one melting at 200° C. with a specific rotation $[\alpha]_D^{20}=+16°$ (c.=1% in chloroform) and the other melting at 168° C. with specific rotation $[\alpha]_D^{20}=+22°$ (c.=1% in chloroform).

(d) *Treatment with hydrochloric acid.*—32.5 gm. of compound IV (mixture of the two isomers were introduced into 32 cc. of ether, 300 cc. of concentrated hydrochloric acid were added and the mixture was agitated in a closed vessel for 20 minutes. Thereafter water was added, the aqueous mixture was extracted several times with methylene chloride and the extracts were washed with a saturated solution of sodium bicarbonate. The extract was dried over magnesium sulfate, treated with animal charcoal, vacuum filtered, then concentrated by distillation until a syrupy consistency was attained. 50 cc. of hexane were added and the mixture was reheated. An important crystallization was produced by the heat. The crystallized product was allowed to stand for an hour at room temperature, vacuum filtered and the product obtained thereby was washed with a mixture of ether and hexane. After drying 27.7 gm. (that is, 82% in relation to product II) of large crystals of a 17-isomer of 17-chloro-17-methyl-18-nor-D-homo-etiocholane-3,11-dione, V, were obtained which melted at 146° C. by recrystallization from a mixture of methylene chloride and hexane, a white product was obtained having a melting point of 148° C. and a specific rotation $[\alpha]_D^{20}=+17.7°$ (c.=1% in chloroform). The product was soluble in acetone, chloroform and methylene chloride; and insoluble in ether, hexane, pentane and petroleum ether.

*Analysis.* — $C_{20}H_{29}O_2Cl$: Molecular weight=336.89. Calculated: C, 71.29%; H, 8.67%; Cl, 10.52%. Found: C, 71.3%; H, 8.7%; Cl, 10.9%.

(2) 17-METHYL-18-NOR-D-HOMO-$\Delta^{16}$-ETIOCHOLENE-3,11-DIONE, VI (a) *Dehydrochlorination.*—A mixture of 330 cc. of dimethylformamide, 18.4 gm. of lithium bromide and 9.25 gm. of lithium carbonate were heated to 100° C., 36.95 gm. of chlorinated compound V (melting point=146° C.) were added thereto and the heating was continued at 125 to 130° C. for 25 minutes. After cooling, water was added and the aqueous suspension was extracted several times with chloroform. The chloroform extracts were washed with water, then dried over magnesium sulfate. The extract was treated with animal charcoal, vacuum filtered and a chloroform solution of a mixture of 17-methyl-18-nor-D-homo-$\Delta^{16}$-etiocholene-3,11-dione and the $\Delta^{17}$-isomers, VI and VIa, was obtained.

For analysis, the two isomers VI and VIa were isolated by chromatography over alumina with elution with cyclohexane and with a mixture of benzene and ether. The $\Delta^{16}$-isomer, VI, melted at 120° C., and had a specific rotation $[\alpha]_D^{20} = -59.8°$ (c.=1% in chloroform), and the $\Delta^{17}$-isomer, VIa, melted at 120° C. and had a specific rotation $[\alpha]_D^{20} = +32.6°$ (c.=1% in chloroform).

(b) *Acetalization.*—100 cc. of ethylene glycol and 2 gm. of p-toluene sulfonic acid were added to the chloroform solution of the two isomers VI and VIa, about ⅓ of the solvent was distilled in 15 minutes and 5 gm. of sodium bicarbonate were added to the hot solution. After cooling, water was added and the aqueous solution was re-extracted with chloroform. The extracts, after treatment with animal charcoal, were concentrated to dryness in vacuo and the residue crystallized from methanol. 21 gm. (that is, 54% of theory) of the 3-ethylene acetal of 17-methyl-18-nor-D-homo-$\Delta^{16}$-etiocholene-3,11 dione, VI, were obtained, which melted at 140 to 142° C.

(c) *Hydrolysis.*—21 gm. of the 3-ethylene acetal of compound VI were introduced into 42 cc. of acetic acid and 21 cc. of water and the mixture was heated to 90° C. for 30 minutes. After cooling, water was added and the mixture was extracted several times with methylene chloride. The combined extracts were washed with water, with a solution of sodium bicarbonate and with water, then dried over magnesium sulfate. After treatment with animal charcoal and filtration, the solution was evaporated to dryness in vacuo and the residue was crystalized from hexane. 14.66 gm. (that is, 44.7%) of 17-methyl-18-nor-D-homo-$\Delta^{16}$-etiocholene-3,11-dione, VI, having a melting point of 118° C. were recovered. The product was soluble in alcohol, ether, benzene, acetone and chloroform; less soluble in petroleum ether and pentane, and insoluble in water.

(d) *Regeneration of the chlorinated derivative.*—The methanol mother liquors of the acetal of compound VI obtained under (b) above and the hexane mother liquor of compound VI obtained under (c) above were combined and concentrated to dryness in vacuo. The residue was redissolved in 15 cc. of ether, 120 cc. of concentrated hydrochloric acid was added and the mixture was agitated at room temperature for 45 minutes. After the addition of water the aqueous mixture was extracted with methylene chloride. The extracts were combined, washed with water, with a solution of sodium bicarbonate, then dried, treated with animal charcoal, filtered and evaporated to dryness.

The residue, taken up in 30 cc. of hexane, was carried to reflux. The chlorinated compound V, 17-chloro-17-methyl-18-nor-D-homo-etiocholene-3,11-dione, having a melting point of 148° C., crystallized out immediately. After washing with ether and with hexane, 15.2 gm. of the product identical to that obtained under (1)(d) above were recovered. By concentration of the mother liquor and redissolution in ether, a second yield of the product weighing 1.05 gm. was obtained.

(3) 18-NOR-$\Delta^{16}$-PREGNENE-3,11,20-TRIONE, I (a) *Ozonization.*—10 gm. of compound VI were dissolved in 170 cc. of anhydrous methanol, then, while passing stream of oxygen and while agitating, the solution was cooled by a mixture of absolute alcohol and solid carbon dioxide maintained at −75° C., and ozonized oxygen was bubbled through the solution of compound VI for 3 hours. The resulting solution of the ozonide of 17-methyl-18-nor-D-homo-$\Delta^{16}$-etiocholene-3,11-dione, VII, was directly reduced in the following stage of the synthesis.

(b) *Reduction.*—A stream of hydrogen was bubbled through the solution of the ozonide VII, obtained according to (a) above, and cooled to −70° C. 20 gm. of powdered zinc were added, then, under agitation, 20 cc. of acetic acid were added thereto. The temperature was allowed to rise to −5° C. in 30 minutes, then the zinc was removed by vacuum filtration. 40 cc. of water were added to the reaction mixture and the solvents were driven off in vacuo and under an atmosphere of nitrogen until the beginning of crystallization of zinc acetate. After the addition of 50 cc. of methylene chloride and 500 cc. of water containing 5 cc. of concentrated hydrochloric acid, the mixture was agitated, decanted and the aqueous layer was reextracted several times with methylene chloride. The combined organic solutions were washed with a solution of sodium bicarbonate and with water, then dried over magnesium sulfate. The organic solution was concentrated to a small volume, 55 cc. of ethanol were added and the remaining methylene chloride was driven off in vacuo. Thus an alcoholic solution of the aldehyde 2$\alpha$-acetonyl-4,7-dione-1$\beta$-formylmethyl-4b$\beta$-methyl-8a$\beta$-perhydrophenanthrene, VIII, was obtained, which was directly usable for the following stage of the synthesis.

By evaporation to dryness in vacuo of this solution and chromatography over alumina with elution by methanol, 18-nor-pregnane-16$\xi$-ol-3,11,20-trione, VIIIa, isomer of the aldehyde VIII, having a melting point of 220° C. was obtained.

(c) *Cyclization.*—The alcoholic solution of the aldehyde VIII was introduced, under an atmosphere of nitrogen, into 500 cc. of water heated to 85 to 90° C. and previously degassed. 10 cc. of normal sodium hydroxide were added and the heating was continued at 85 to 90° C. for one hour, still under an atmosphere of nitrogen. A slightly oily crystalline suspension was formed which was cooled to 30° C. The suspension was vacuum filtered, the precipitate was washed with water and dried to recover 9 gm. of raw compound I which was recrystallized from aqueous acetic acid. 6.43 gm. of the pure product, $\Delta^{16}$-18-nor-pregnene-3,11,20-trione, I (that is, 61% in relation to the quantity of compound VI used), were obtained having a melting point of 174 to 175° C. and a specific rotation $[\alpha]_D^{20} = +97° \pm 2$ (c=1% in chloroform). The product was obtained in the form of colorless needles, very soluble in chloroform, soluble in acetone, slightly soluble in alcohol and ether and insoluble in water and dilute aqueous acids or alkalies.

*Analysis.*—$C_{20}H_{26}O_3$: Molecular weight=314.41. Calculated: C, 76.40%; H, 8.34%; O, 15.27%. Found: C, 76.2%; H, 8.3%; O, 16%.

Ultraviolet spectrum, $\lambda$ max. 236 m$\mu$, $\epsilon$=9500.

While working in an analogous manner with the 16$\xi$-hydroxy derivative, VIIIa, compound I was obtained with the same yields.

It will be understood that the invention is not limited to the modes of operation described above. It is possible to use as the starting material any other easily saponifiable ester of 18-nor-D-homo-etiocholane-3$\alpha$-ol-11,17-dione or even to use the equivalent techniques known to those skilled in the art without departing from the spirit of the invention or the scope of the appended claims.

We claim:

1. $\Delta^{16}$-18-nor-pregnene-3,11,20-trione.
2. 3$\alpha$-acetoxy-17-methyl-18-nor-D-homo-etiocholane-17-ol-11-one.
3. 17-methyl-18-nor-D-homo-etiocholane-3$\alpha$,17-diol-11-one.
4. 17-methyl-18-nor-D-homo-etiocholane-17-ol-3,11-dione.
5. 17-chloro-17-methyl-18-nor-D-homo-etiocholane-3,11-dione.
6. 17-methyl-18-nor-D-homo-$\Delta^{16}$-etiocholene-3,11-dione.
7. The 3-ethylene acetal of 17-methyl-18-nor-D-homo-$\Delta^{16}$-etiocholene-3,11-dione.
8. 17-methyl-18-nor-D-homo-$\Delta^{17}$-etiocholene-3,11-dione.
9. The 3-ethylene acetal of 17-methyl-18-nor-D-homo-$\Delta^{17}$-etiocholene-3,11-dione.

10. The ozonide of 17-methyl-18-nor-D-homo-$\Delta^{16}$-etiocholene-3,11-dione.

11. 2α-acetonyl-4,7-dione-1β-formylmethyl-4bβ-methyl-8aβ-perhydrophenanthrene.

12. 18-nor-pregane-16ξ-ol-3,11,20-trione.

13. The process of producing $\Delta^{16}$-18-nor-pregnene-3,11,20-trione which comprises the steps of reacting a readily saponifiable organic carboxylic acid ester of 18-nor-D-homo-etiocholane-3α-ol-11,17-dione with a methyl Grignard compound, saponifying the resulting compound, oxidizing the 17-methyl-18-nor-D-homo-etiocholane-3α,-17-diol-11-one with an oxidizing agent selected from the group consisting of N-bromo-amides and N-bromo-imides in the presence of an aqueous tertiary-lower-alkanol whereby the 3α-hydroxyl group is converted to a ketone, reacting the 17-methyl-18-nor-D-homo-etiocholane-17-ol-3,11-dione with concentrated hydrochloric acid, dehydrochlorinating the 17-chloro-17-methyl-18-nor-D-homo-etiocholane-3,11-dione whereby a mixture of 17-methyl-18-nor-D-homo-$\Delta^{16}$-etiocholene-3,11-dione and its $\Delta^{17}$ isomer is obtained, reacting said mixture of $\Delta^{16}$ and $\Delta^{17}$ isomers under acetalizing conditions whereby the 3-ketone is acetalized, separating said $\Delta^{16}$-3-acetal from its $\Delta^{17}$-3-acetal isomer, hydrolyzing said $\Delta^{16}$-3-acetal to liberate the 3-ketone, reacting the 17-methyl-18-nor-D-homo-$\Delta^{16}$-etiocholene-3,11-dione with ozone at low temperatures, reducing the ozonide of 17-methyl-18-nor-D-homo-$\Delta^{16}$-etiocholene-3,11-dione by the action of hydrogen and thereafter zinc in the presence of an organic acid at a temperature between —75° C. and 0° C., and isolating a lower alkanol solution of 2α-acetonyl-4,7-dione-1β-formylmethyl-4bβ-methyl-8aβ-perhydrophenanthrene, cyclizing said perhydrophenanthrene by reacting with an alkaline base and recovering said $\Delta^{16}$-18-nor-pregnene-3,11,20-trione.

14. The process of claim 13 wherein 3α-acetoxy-18-nor-D-homo-etiocholane-11,17-dione is utilized as the readily saponifiable starting compound.

15. The process of claim 13 wherein said 17-methyl-18-nor-D-homo-$\Delta^{17}$-etiocholene-3,11-dione is reacted with concentrated hydrochloric acid and the 17-chloro-17-methyl-18-nor-D-homo-etiocholane-3,11-dione is further reacted according to claim 13.

16. The process of claim 13 wherein said lower alkanol solution of 2α-acetonyl-4,7-dione-1β-formylmethyl-4bβ-methyl-8aβ-perhydrophenanthrene is evaporated to dryness, the 18-nor-pregnane-16ξ-ol-3,11,20-trione is reacted with an alkaline base and $\Delta^{16}$-18-nor-pregnene-3,11,20-trione is recovered.

References Cited in the file of this patent
UNITED STATES PATENTS
2,979,518    Van Dorp et al. _____ Apr. 11, 1961
OTHER REFERENCES
Fieser and Fieser: "Steroids," pages 693–4 (1959).

UNITED STATES PATENT OFFICE
CERTIFICATION OF CORRECTION

January 23, 1962

Patent No. 3,018,293

Gaston Amiard et al.

It is hereby certified that error appears in the above numbered patent requiring correction and that the said Letters Patent should read as corrected below.

Column 3, formulas (VIIIa) and (I) should appear as shown below instead of as in the patent:

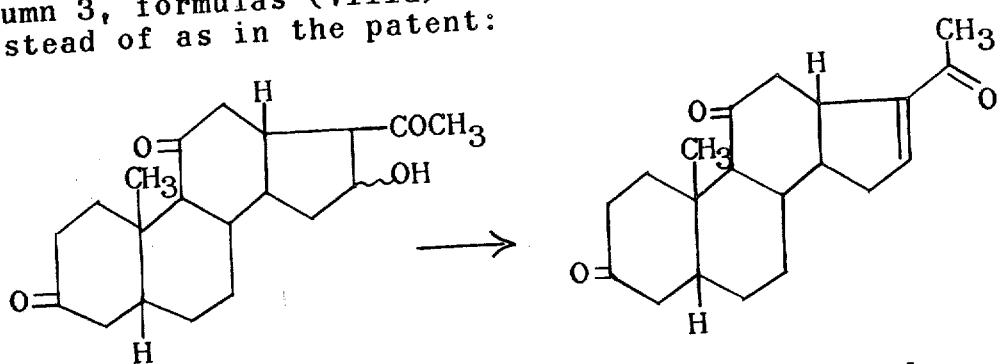

column 4, line 57, for "3αhydroxyl" read -- 3α-hydroxyl --; line 64, for "3-11-dione" read -- 3,11-dione --; column 5, line 47, for "N-methyl" read -- N methyl --; line 71, for "for" read -- For --; column 6, line 34, after "isomers" insert a closing parenthesis; line 52, for "by" read -- By --; column 7, line 53, for "-etiocholene-" read -- -etiocholane- --; column 9, line 5, for "-pregane-" read -- -pregnane- --; line 6, for "-pregnene-3,-" read -- -pregnene-3, --.

Signed and sealed this 19th day of June 1962.

(SEAL)
Attest:

ERNEST W. SWIDER
Attesting Officer

DAVID L. LADD
Commissioner of Patents